(12) United States Patent
Chin et al.

(10) Patent No.: US 12,066,949 B2
(45) Date of Patent: Aug. 20, 2024

(54) ADDRESS TRANSLATION BASED ON PAGE IDENTIFIER AND QUEUE IDENTIFIER

(71) Applicant: Micron Technology, Inc., Boise, ID (US)

(72) Inventors: Chung Kuang Chin, Saratoga, CA (US); Di Hsien Ngu, Zhubei (TW); Horia C. Simionescu, Foster City, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/541,786

(22) Filed: Dec. 3, 2021

(65) Prior Publication Data

US 2023/0176978 A1 Jun. 8, 2023

(51) Int. Cl.
 G06F 12/1009 (2016.01)
(52) U.S. Cl.
 CPC .... G06F 12/1009 (2013.01); *G06F 2212/651* (2013.01); *G06F 2212/7201* (2013.01)

(58) Field of Classification Search
 CPC .......... G06F 12/1009; G06F 2212/651; G06F 2212/7201
 See application file for complete search history.

(56) References Cited

U.S. PATENT DOCUMENTS

| | | | |
|---|---|---|---|
| 5,784,707 A * | 7/1998 | Khalidi | G06F 12/1027 711/201 |
| 9,405,703 B2 | 8/2016 | Loh | |
| 10,372,618 B2 | 8/2019 | Dooley et al. | |
| 10,528,480 B2 | 1/2020 | Lal et al. | |
| 2020/0218665 A1 | 7/2020 | Swaine | |

* cited by examiner

*Primary Examiner* — Chie Yew
(74) *Attorney, Agent, or Firm* — Brooks, Cameron & Huebsch, PLLC

(57) ABSTRACT

Translated addresses of a memory device can be stored in a first LUT maintained by control circuitry. Untranslated addresses can be stored in a second LUT maintained by the control circuitry. In response to a translation request for a particular translated address of the memory device corresponding to a target untranslated address, an index of the second LUT associated with the target untranslated address can be determined, the index of the second LUT can be mapped to an index of the first LUT, and the particular translated address corresponding to the target untranslated address can be retrieved from the first LUT.

11 Claims, 4 Drawing Sheets

ADDRESS TRANSLATION BASED ON PAGE IDENTIFIER AND QUEUE IDENTIFIER

TECHNICAL FIELD

The present disclosure relates generally to memory devices, and more particularly, to apparatuses and methods related to address translation.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
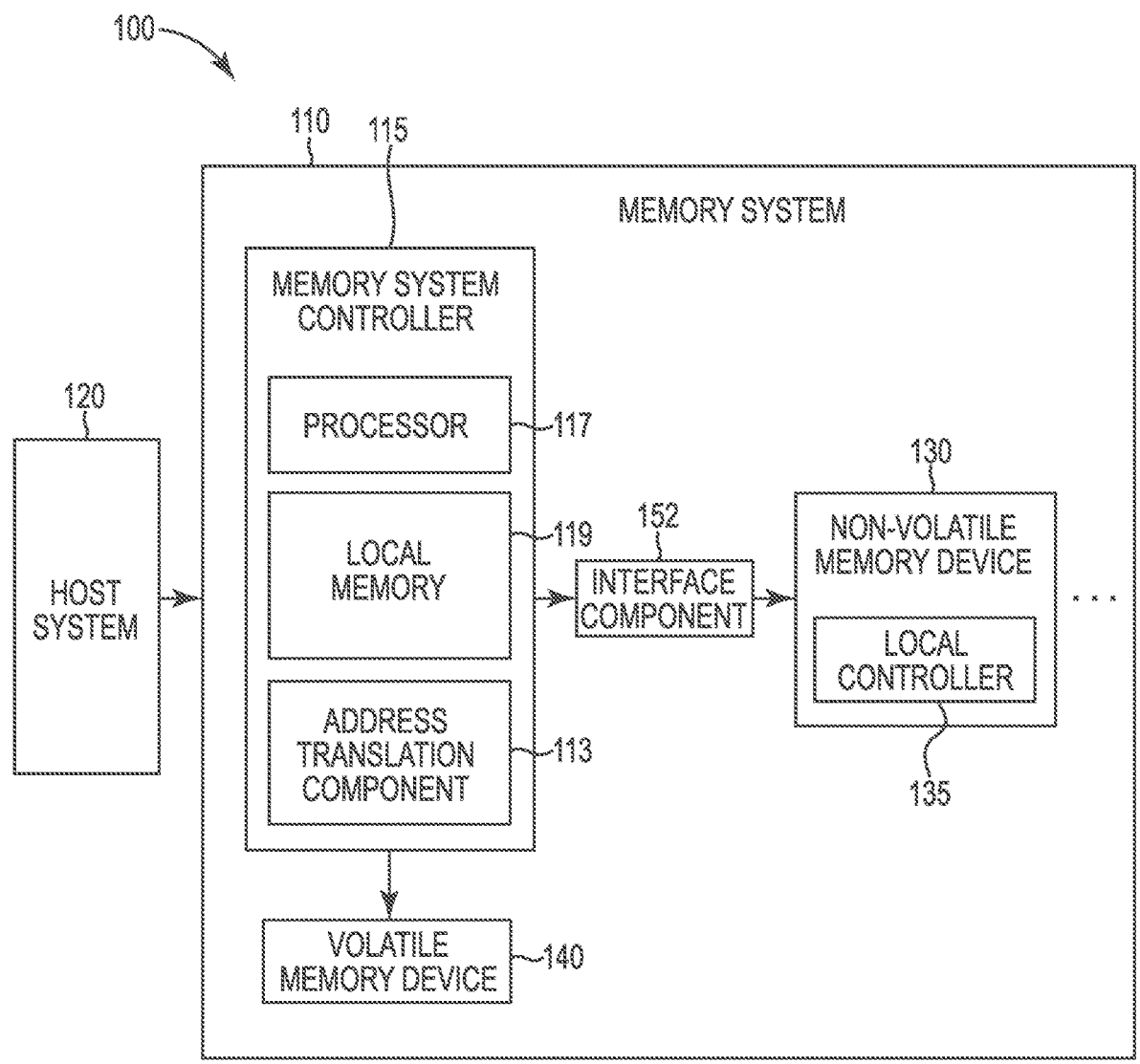
FIG. 1 is a block diagram of an apparatus in the form of a computing system including a memory device in accordance with a number of embodiments of the present disclosure.

The present disclosure includes apparatuses and methods related to address translation. As used herein, "address translation" refers to determining a physical address (e.g., physical block address, physical media location) of a memory (e.g., memory die, memory bank) of a memory device that corresponds to a logical address (e.g., logical block address (LBA), namespace). Address translation may include use of an address translation cache (ATC). Some previous approaches to address translation may use a content-addressable memory (CAM) (e.g., fully associated cache) as an ATC. However, a CAM may have a limited capacity. For example, a CAM may be able to store up to one thousand (1K) entries. A gate count of a CAM may be so high that implementing a CAM as an ATC is impractical. A set-associative cache cannot be used as an ATC because often only a host device can invalidate an entry of an ATC.

Control circuitry of a memory device can comply with a non-volatile memory express (NVMe) specification. A NVMe module can have a finite number of queues, each having a finite number of pages. An ATC protocol can be executed at a relatively low frequency. Embodiments of the present disclosure address the above deficiencies and other deficiencies of previous approaches by using a lookup table (LUT) to store translated addresses. As used herein, an "untranslated address" refers to a logical address associated with data values stored in a memory device. As used herein, a "translated address" refers to a physical address of a memory device at which data values are stored. Thus, a translated address corresponding to an untranslated address is a physical address corresponding a logical address.

In contrast to previous approaches that use an untranslated address to look up and retrieve a corresponding translated address from a CAM, at least one embodiment uses an index of a LUT, hereinafter referred to as an LUT ID, to look up and retrieve the corresponding translated address from the CAM. As described herein, a LUT ID can be allocated from a free pool of LUT IDs in response to a translation request. Allocated LUT IDs can be stored in another LUT. A translation request can include indices of this other LUT by which the allocated LUT ID can be obtained. It should be noted that a translation request does not necessarily imply that the untranslated address associated with the translation request has not been translated previously.

An ATC in accordance with the present disclosure can unilaterally make translation requests on behalf of NVMe control circuitry. As a result, the NVMe control circuitry does not need to be aware of address translation service (ATS) support. The ATC can make translation requests for untranslated addresses of pages of memory that have not yet been translated in response to memory requests (e.g., Advanced eXtensible Interface (AXI) memory requests).

An initial memory request for a page of data, for instance, is associated with an untranslated address that does not benefit Physical Region Page (PRP) memory request because an PRP memory request only occurs once. Thus, the NVMe control circuitry makes translation requests in advance of issuing PRP memory requests in order to hide and/or reduce address translation latency while the ATC makes translation requests for other types of memory (e.g. 3DXP, NAND) to improve overall system performance, for example.

An ATC in accordance with the present disclosure can store translated addresses in an LUT. When a translation request is made by the ATC, a location in the LUT, indicated by an LUT ID, at which a translated address is stored is assigned. Each LUT ID is associated with an untranslated address as well as the corresponding translated address. LUT IDs described herein are specific to ATCs in accordance with the present disclosure. Therefore, NVMe control circuitry does not need to be aware of the LUT IDs.

An ATC in accordance with the present disclosure can be used for applications other than NVMe control circuitry. At least one embodiment of the present disclosure can include an interface component. The interface component can include hardware (e.g., circuitry), firmware, software, and combinations thereof. The interface component can be a NVMe specific component or a separate component from NVMe control circuitry that shields NVMe control circuitry from address translation operations of the ATC. The interface component can map untranslated addresses to LUT IDs. Because pages of memory compliant with an NVMe specification can be associated with either an PRP queue or an MSI-X queue, a fully associated cache is not required for another LUT of the interface component. Indices of the LUT of the interface component, a queue identifier (QID) and a page identifier (PID), can be used to map an untranslated address to an LUT ID. Subsequently, the LUT ID can be mapped to a corresponding translated address.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The figures herein follow a numbering convention in which the first digit or digits correspond to the drawing figure number and the remaining digits identify an element or component in the drawing. Similar elements or components between different figures may be identified by the use of similar digits. For example, element 115 can represent element 15 in FIG. 1, and a similar element can be labelled 215 in FIG. 2. Analogous elements within a figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory system 110 in accordance with some embodiments of the present disclosure. The memory system 110 can include media, such as one or more volatile memory devices 140, one or more non-volatile memory devices 130, or a combination of such.

A memory system 110 can be a storage device, a memory module, or a hybrid of a storage device and memory module, among other types of memory systems. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory systems 110. In some embodiments, the host system 120 is coupled to different types of memory systems 110. FIG. 1 illustrates one example of a host 120 coupled to one memory system 110.

The host system 120 can include a processor chipset and a software stack executed by the processor chipset. The processor chipset can include one or more cores, one or more caches, a memory controller (e.g., an SSD controller), and a storage protocol controller (e.g., peripheral component interconnect express (PCIe) interface controller, SATA controller). The host system 120 can write data to and/or read data from the memory devices 130, 140 of the memory system 110.

The host system 120 can be coupled to the memory system 110 via a physical host interface (not shown). Examples of a physical host interface include, but are not limited to, serial advanced technology attachment (SATA) interface, PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports DDR), Open NAND Flash Interface (ONFI), Low Power Double Data Rate (LPDDR), or any other interface. The physical host interface can be used to transmit data between the host system 120 and the memory system 110. The host system 120 can further utilize an NVMe interface to access components when the memory system 110 is coupled with the host system 120 by the PCIe interface. The physical host interface can provide an interface for passing control, address, data, and other signals between the memory system 110 and the host system 120. FIG. 1 illustrates a memory system 110 as an example. In general, the host system 120 can access multiple memory systems 110 via a same communication connection, multiple separate communication connections, and/or a combination of communication connections.

The non-volatile memory devices 130 and the volatile memory devices 140 can include various combinations of the different types of non-volatile memory devices and volatile memory devices, respectively. Some examples of volatile memory devices can be, but are not limited to, random access memory (RAM), such as dynamic random-access memory (DRAM) and synchronous dynamic random access memory (SDRAM).

Some examples of non-volatile memory include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

The non-volatile memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, the non-volatile memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 130 can be grouped as pages that can refer to a logical unit of the respective memory devices used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the non-volatile memory 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Memory system controller 115 can communicate with the memory devices 130, 140 to perform operations, such as reading data, writing data, and/or erasing data stored on the non-volatile memory devices 130 and the volatile memory devices 140, and other such operations. The memory system controller 115 can include hardware such as one or more integrated circuits and/or discrete components, a buffer memory, or a combination thereof. The hardware can include digital circuitry with dedicated (i.e., hard-coded) logic to perform the operations described herein. The memory system controller 115 can be a microcontroller, special purpose logic circuitry (e.g., a field programmable gate array (FPGA), an application specific integrated circuit (ASIC), etc.), or other suitable processor.

The memory system controller 115 can include a processor 117 (e.g., a processing device) configured to execute instructions stored in a local memory 119. In the illustrated example, the local memory 119 of the memory system controller 115 includes an embedded memory configured to store instructions for performing various processes, operations, logic flows, and routines that control operation of the memory system 110, including handling communications between the memory system 110 and the host system 120.

In some embodiments, the local memory 119 can include memory registers storing memory pointers, fetched data, etc. The local memory 119 can also include read-only memory (ROM) for storing micro-code. Although the memory system 110 is illustrated as including the memory system controller 115, in another embodiment of the present disclosure, a memory system 110 does not include a memory system controller 115, and can instead rely upon external control (e.g., provided by an external host, or by a processor or controller separate from the memory system) to access the memory devices 130, 140.

In general, the memory system controller 115 can receive commands or operations from the host system 120 and can convert the commands or operations into instructions or appropriate commands to achieve the desired access to the non-volatile memory devices 130 and/or the volatile memory devices 140. The memory system controller 115 can be responsible for other operations such as wear leveling operations, garbage collection operations, error detection and error-correcting code (ECC) operations, encryption operations, caching operations, and address translations between an untranslated address (e.g., logical block address (LBA), namespace) and a physical address (e.g., physical block address, physical media locations, etc.) that are associated with the non-volatile memory devices 130. The memory system controller 115 can further include host interface circuitry to communicate with the host system 120 via the physical host interface. The host interface circuitry can convert the commands received from the host system 120 into command instructions to access the non-volatile memory device 130 and/or the volatile memory device 140 as well as convert responses associated with the non-volatile memory device 130 and/or the volatile memory device 140 into information for the host system 120.

The memory system 110 can also include additional circuitry or components that are not illustrated. In some embodiments, the memory system 110 can include a cache or buffer (e.g., DRAM) and address circuitry (e.g., a row decoder and a column decoder) that can receive an address from the memory system controller 115 and decode the address to access the non-volatile memory device 130 and/or the volatile memory device 140.

In some embodiments, the memory devices (e.g., non-volatile memory device 130) can include a local controller 135 that can operate in conjunction with the memory system controller 115 to execute operations on one or more memory cells of the non-volatile memory device 130. An external controller (e.g., the memory system controller 115) can externally manage the non-volatile memory device 130 (e.g., perform media management operations on the non-volatile memory device 130). In some embodiments, the non-volatile memory device 130 can be a managed memory. Managed memory is raw memory combined with a local controller (e.g., the local controller 135) for media management within the same memory device package. An example of a managed memory device is a managed NAND (MNAND) device.

The memory system 110 can include an address translation component 113. Although not shown in FIG. 1, the address translation component 113 can include circuitry to facilitate address translation. A LUT storing translated addresses of the memory system 110 can be resident on the address translation component 113. In some embodiments, the address translation component 113 can include special purpose circuitry in the form of an ASIC, FPGA, state machine, and/or other logic circuitry that can enable the address translation component 113 to receive a LUT ID from the local memory controller 135 and retrieve the translated address associated with the LUT ID from the LUT, for example. In some embodiments, the memory system controller 115 includes at least a portion of the address translation component 113. For example, the memory system controller 115 can include the processor 117 (e.g., processing device) configured to execute instructions stored in the local memory 119 for performing the operations described herein.

The memory system 110 can include interface component 152 coupled to the memory system controller 115 and the local controller 135 to facilitate address translation. A different LUT can be resident on the interface component 152 that stores LUT IDs of the LUT resident on the address translation component 113. In some embodiments, the interface component 152 can include special purpose circuitry in the form of an ASIC, FPGA, state machine, and/or other logic circuitry. The LUT of the interface component 152 can be indexed by page identifiers (PIDs) and queue identifiers (QIDs). The interface component 152 can receive a translation request for a target untranslated address from the local controller 135. The translation request can include an PID and an QID associated with the target untranslated address. The interface component 152 can receive the PID and the QID and retrieve an LUT ID from the LUT resident on the interface component 152. The interface component 152 can communicate the retrieved LUT ID to the address translation component 113. The address translation component 113 can then translate the target untranslated address by retrieving the translated address corresponding to the target untranslated address from the LUT resident on the address translation component 113 as described herein.

Figure 2:
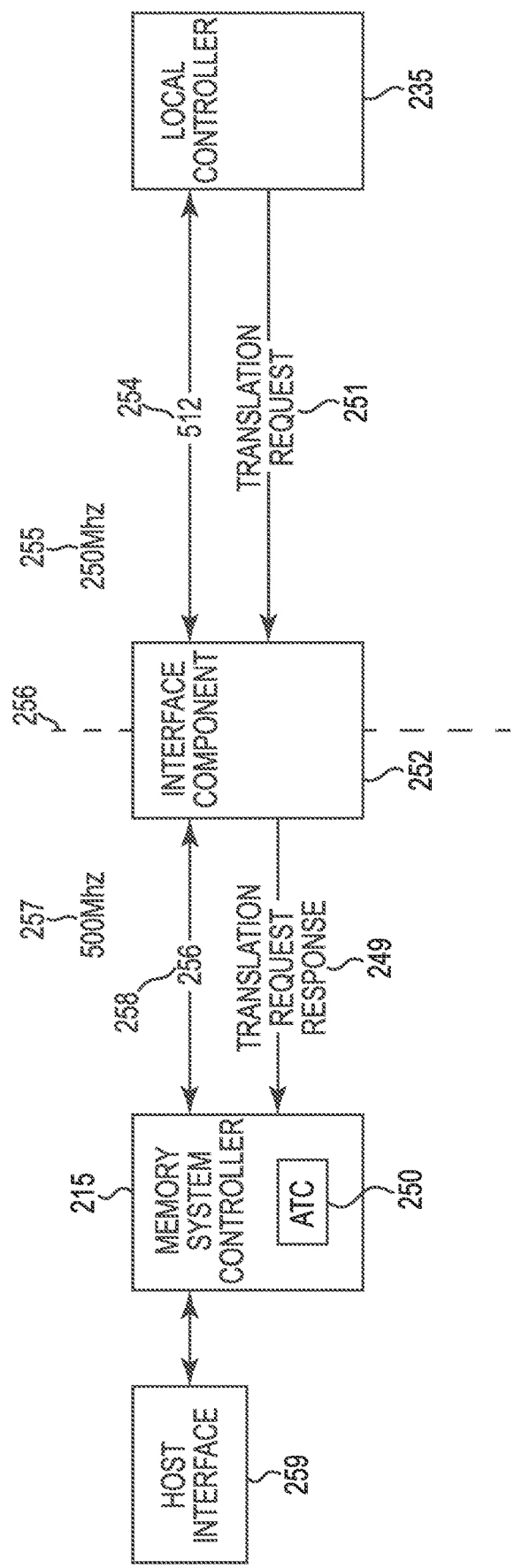
FIG. 2 is a block diagram of a memory system controller and local controller of an apparatus in accordance with a number of embodiments of the present disclosure.

FIG. 2 is a block diagram of a memory system controller 215 and local controller 235 of an apparatus in accordance with a number of embodiments of the present disclosure. The memory system controller 215 and the local controller 235 can be analogous to the memory system controller 115 and the local controller 135 of the memory system 110 described in association with FIG. 1. FIG. 2 illustrates circuitry and components of a memory system involved in address translation according to the present disclosure. However, FIG. 2 is not intended to exclude embodiments of the present disclosure from including other circuitry and components of a memory system.

As illustrated by FIG. 2, the local controller 235 can issue a translation request 251. The translation request 251 can include one or more target untranslated addresses, and PIDs and QIDs associated with the target untranslated addresses. The value of an QID is indicative of a type of page of memory. The value of an PID is indicative of particular (e.g., target) pages of memory of the type indicated by the QID. The local controller 235 can comply with NVME specification."

The interface component 233 can receive the translation request 251 from the local memory controller 235. The interface component 252 can maintain a LUT storing LUT IDs of a different LUT maintained by memory system controller 215. The interface component 252 can map the QID and the PID of the translation request 251 to an LUT ID. The LUT maintained by the interface component 252 is indexed by QIDs and PIDs. The interface component 252 can retrieve the LUT ID from the LUT at a location associated with the PID and the QID. The interface component 252 can communicate the translation request 249 to the memory system controller 215. The translation request 249 includes the target untranslated address. The response to the translation request 249 includes the LUT ID.

The memory system controller 215 can receive the translation request 249. As described herein and illustrated by FIG. 2, the memory system controller 215 can maintain a LUT that serves as an ATC 250. The LUT (ATC 250) stores translated addresses that are indexed by LUT IDs. The memory system controller 215 can retrieve a translated address from the LUT at a location associated with the LUT ID of the translation request 249.

The translated address can be communicated from the memory system controller 215 to a host interface 259 and/or the local controller 235. The local memory controller 235 can communicate read and/or write requests from the host. The local memory controller 235 can communicate MSI-X requests from the ATC 250. The host interface 259 can comply with a PCIe specification. Although the host interface 259 is illustrated by FIG. 2 as being separate from the memory system controller 215, in some embodiments the host interface 259 and the memory system controller 215 can be parts of a single component.

The dashed line 256 represents clock domain crossing. As indicated at 255 and 257 of FIG. 2, the local controller 235 and the memory system controller 215 can operate according to respective, different clocks. For instance, the frequency of a clock of the local controller 235 (e.g., 250 megahertz (MHz)) can different than the frequency of a clock of the memory system controller 215 (e.g., 500 MHz). The interface component 252 facilitates communication between the local controller 235 and the memory system controller 215, despite the different clocks.

As indicated at 254 and 258 of FIG. 2, the local controller 235 and the memory system controller 215 can support respective different bandwidths. For instance, the local controller 235 can support a bandwidth of 512 megabytes (MB) whereas the memory system controller 215 can support a bandwidth of 256 MB. The interface component 252 facilitates communication between the local controller 235 and the memory system controller 215, despite the different bandwidths.

Figure 3:
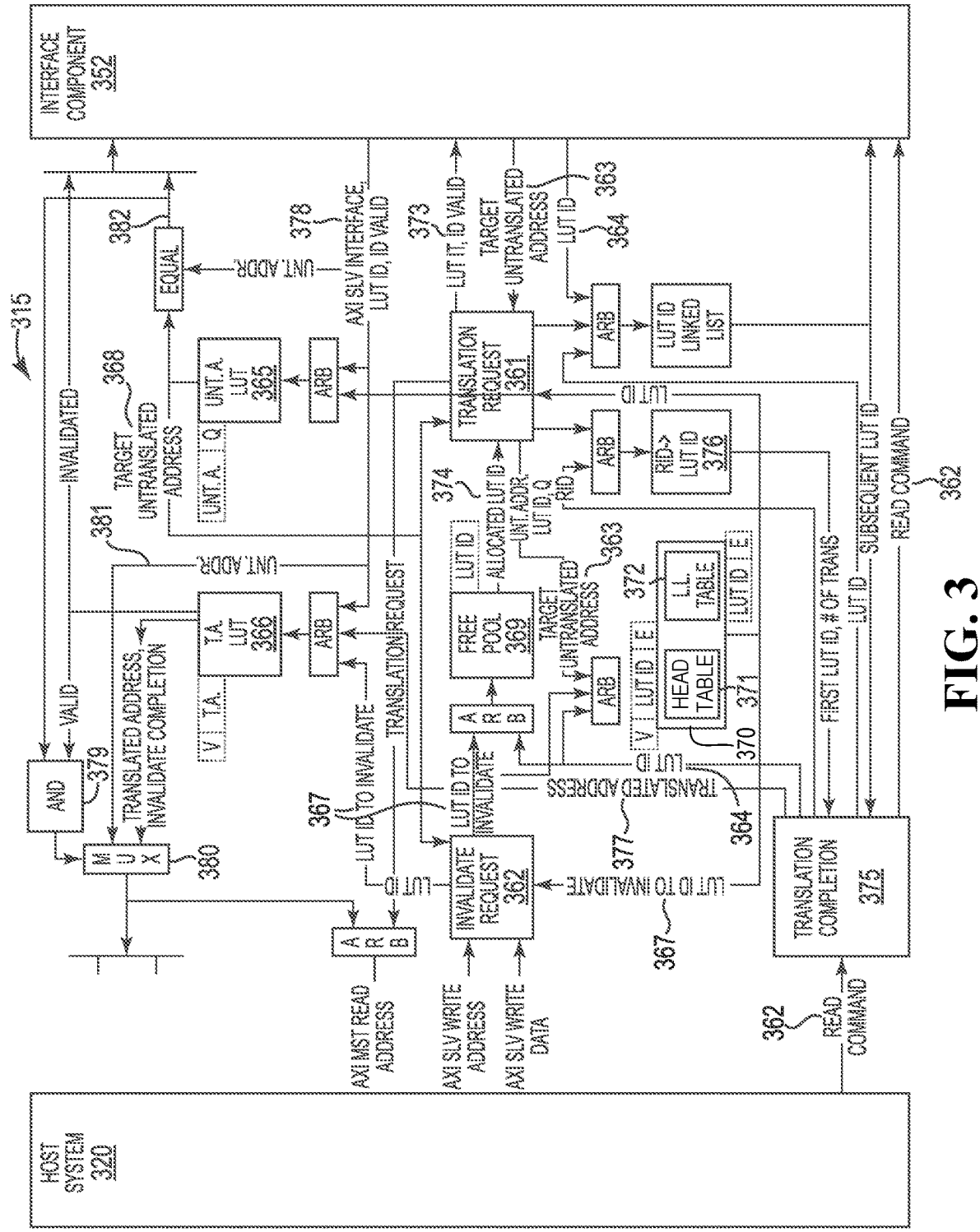
FIG. 3 is a block diagram representation of address translation in accordance with a number of embodiments of the present disclosure.

FIG. 3 is a block diagram representation of address translation in accordance with a number of embodiments of the present disclosure. The host system 320 and the interface component 352 can be analogous to the host system 120 and the interface component 152 described in association with FIG. 1. FIG. 3 illustrates, between the host system 320 and the interface component 352, a block diagram representation of address translation and related operations performed by the memory system controller 315.

Before the ATC communicates a translation request to the host system 320, the ATC first searches through a hash-based search table with an LUT ID corresponding to the translation request. The hash-based search table includes a head table 371, a linked list table 372, and an untranslated address table. If the search by the ATC results in a hit, then the corresponding LUT ID is returned to the interface component 352. If the search by the ATC results in a miss, then an LUT ID is allocated from a free pool 369 of LUT IDs. The allocated LUT ID is communicated to the interface component 352 and inserted into the search table.

Execution of a translation request function 361 can include using different data structures such as one or more of a free pool 369 of LUT IDs, a hash table 370 consisting a head table 371 and a linked list table 372, an untranslated address table 365 (UNT. A. LUT), and a free pool of requester identifiers (RIDs) (not shown in FIG. 3). An RID can identify which memory bank of a memory device an untranslated address or a target address corresponds. The head table 371 records an initial LUT ID of a list of untranslated addresses. The link list table 372 records additional LUT IDs of the list of untranslated address. The length of the link list table 372 is variable.

In some embodiments, the RID can be a RID on an AXI bus. After the ATC communicates a translation request to the host system 320 via the memory system controller 315 (e.g., a PCIe controller), the memory system controller 315 communicates the translated address to the ATC via the AXI bus. The ATC stores the translated address in a translated address table 366. The ATC uses the RID of the AXI bus to index a RID-to-LUT ID table 376 to get the LUT ID. Before the ATC communicates a translation request to the host system 320, an RID is allocated so that the LUT ID can be stored in the RID-to-LUT ID table 376.

In some embodiments, the local memory controller (not shown in FIG. 3) can support a multi-function memory system controller. Executing the translation request function 361 can include using an untranslated address (e.g., the target untranslated address 363) and a function identifier (FID) to lookup an LUT ID 364 associated with the untranslated address in the hash table 370. If the lookup in the hash table 370 results in a hit, then, at 373, the LUT ID 364 is communicated back to the interface component 352 as a valid LUT ID. If the lookup in the hash table 370 results in a miss, then an LUT ID 374 is allocated from a free pool 369 of LUT IDs. At 373, the allocated LUT ID 374 is communicated to the interface component 352. The allocated LUT ID 374 is inserted into the hash table 370. The untranslated address and associated QID, PID, and FID is inserted into the untranslated address table 365. After, at 373, the LUT ID is communicated to the interface component 352 for a translation request, an RID is allocated from the free pool of RIDs and a translation request message is generated. The translation request message can be sent to a PCIe core of the memory system controller 315. The untranslated address 363 can be incremented and steps described herein can be repeated for translation of multiple and untranslated addresses.

Execution of a translation completion function 375 can include using different data structures such as one or more of the free pool 369 of LUT IDs, the hash table 370, the untranslated address table 365, the free pool of RIDs, a RID to LUT ID table 376, and a translated address table 366 (T. A. LUT). Executing the translation completion function 375 can include using a RID of a read data bus (e.g., an AXI read data bus) to lookup a LUT ID from the RID to LUT ID table 376. The memory system controller 315 can then release the RID back to the free pool of RIDs. The memory system controller 315 can write a translated address 377 and associated attributes (e.g., untranslated, readable, writable, non-snooped) to the translated address table 366 at a location of the translated address table 366 indexed by the LUT ID 364.

If a translation completion error occurs (received from an AXI bus, for instance), then the memory system controller 315 can delete the LUT ID 364 from the hash table 370 and return the LUT ID 364 to the free pool 369 of LUT IDs. All ones can be written to the entry of the untranslated address table 365 indexed by the LUT ID 364. The untranslated address 363 and the associated QID can be communicated to the interface component 352.

Execution of an invalidate request function 362 can include using different data structures such as one or more of the free pool 369 of LUT IDs, the hash table 370, the untranslated address table 365, the free pool of RIDs, a RID to LUT ID table 376, and a translated address table 366. Executing the invalidate function 362 can include using an untranslated address (e.g., the target untranslated address 368) and an FID of an invalidate request message (received from the host system 320) to look up a corresponding LUT ID in the hash table 370. If the lookup in the hash table 370 results in a hit, then the found LUT ID 367 is returned to the free pool 369 of LUT IDs and the entry of the translated address table 366 indexed by the LUT ID 367 is invalidated. If the lookup in the hash table 370 results in a miss, then an error condition exists.

The memory system controller 315 can verify that QIDs and PIDs received from the interface component 352 correspond to respective target untranslated addresses. At 378, the interface component 352 can communicate an LUT ID and an indication of the LUT ID being valid (ID Valid) to the memory system controller 315 as sideband signals on address channels. If the ID Valid signal is de-asserted, then no address table lookup will occur. Otherwise, the LUT ID is used to lookup to retrieve a corresponding translated address from the translated address table 366 and the untranslated address table 365. If the LUT ID is valid, and the untranslated address and FID of the interface component 352 and the untranslated address table 365 match (at AND 379), then, at the multiplexer 380, the corresponding trans-lated address from the translated address table 366 is used. Otherwise, at the multiplexer 380, the corresponding untranslated address 381 is communicated to the PCIe core of the memory system controller 315.

If the LUT ID is invalidated and the untranslated address and FID of the interface component 352 and the untranslated address table 365 match (at AND 379), then, at 382, the untranslated address and the associated QID and PID (read from the untranslated address table 365) is communicated to the interface component 352. The interface component 352 can decide whether to issue the translation request again. If the LUT ID is valid, but the untranslated address and FID of the interface component 352 and the untranslated address table 365 do not match (at AND 379), then, at 382, the untranslated address and the associated QID and PID (read from the untranslated address table 365) is communicated to the interface component 352.

In some embodiments, LUT IDs can be retired proactively. Only the host system 320 has the authority to cause an LUT ID to be invalidated. Thus, if the host system 320 does not invalidate LUT IDs frequently, then LUT IDs no longer needed by the local memory controller (not illustrated by FIG. 3), such as the local controller 135, may still be stored by the memory system controller 315. The memory system controller 315 can maintain a record (in a first in, first out (FIFO), for instance) of LUT IDs that have been allocated for pages of memory that may benefit from proactive retirement. When the quantity of available LUT IDs of the free pool 369 is below a threshold, then LUT IDs stored in the FIFO can be invalidated as described herein. When an LUT ID has been proactively retired, an invalidation completion message is sent.

Figure 4:
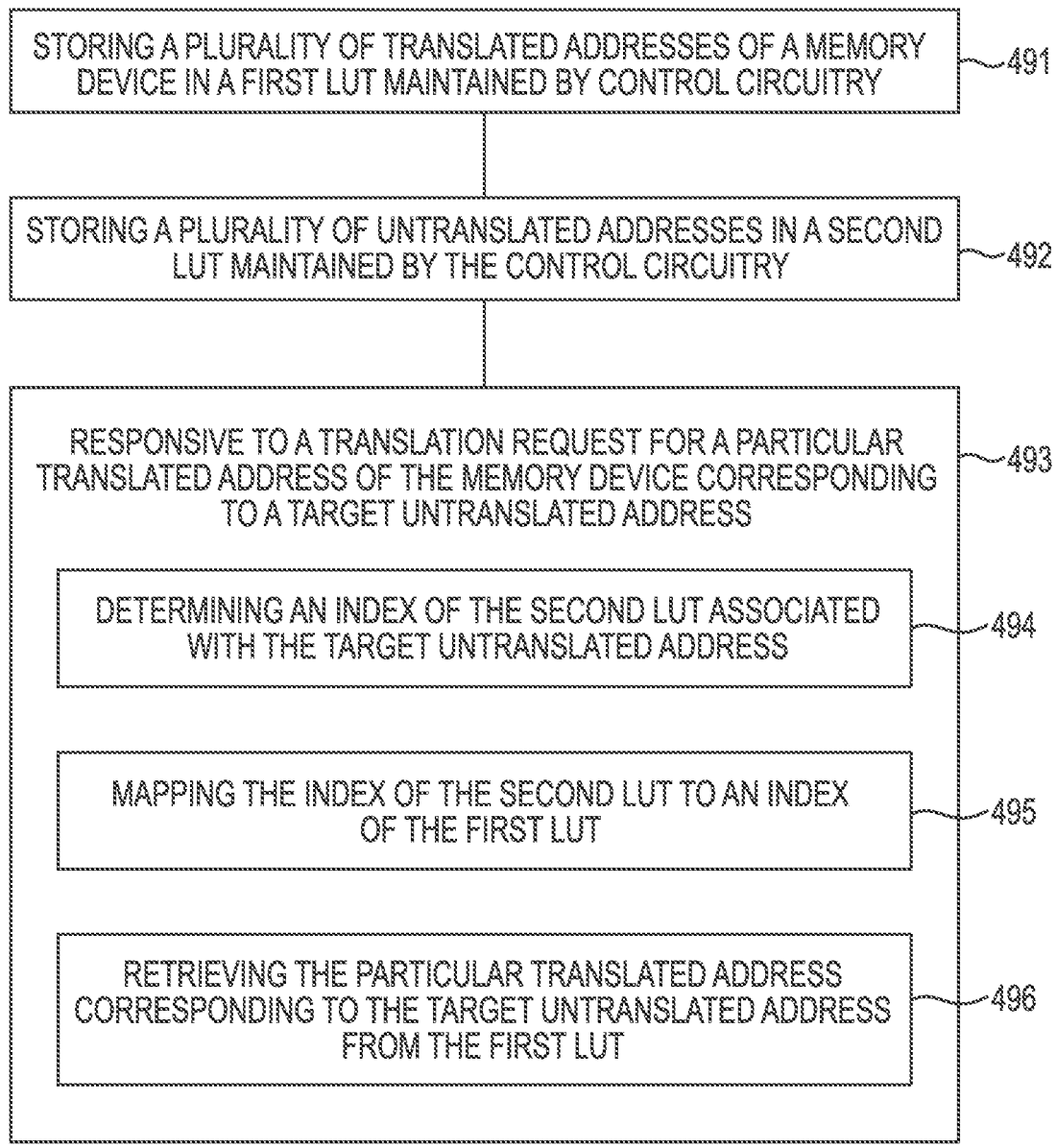
FIG. 4 illustrates an example flow diagram of a method for address translation in accordance with a number of embodiments of the present disclosure.

FIG. 4 illustrates an example flow diagram of a method 490 for address translation in accordance with a number of embodiments of the present disclosure. The method 490 can be performed by processing logic that can include hardware (e.g., processing device, circuitry, dedicated logic, programmable logic, microcode, hardware of a device, integrated circuit, etc.), software (e.g., instructions run or executed on a processing device), or combinations thereof. In some embodiments, the method 490 is performed by the memory system controller 115 and the local controller 135 described in association with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 491, the method 490 can include storing a plurality of translated addresses of a memory device in a first LUT maintained by control circuitry. Storing the plurality of translated addresses can include storing the plurality of translated addresses in the first LUT maintained by a first portion of the control circuitry.

At block 492, the method 490 can include storing a plurality of untranslated addresses in a second LUT maintained by the control circuitry. Storing the plurality of untranslated addresses can include storing the plurality of untranslated addresses in the second LUT maintained by a second portion of the control circuitry.

At block 493, the method 490 can include, responsive to a translation request for a particular translated address of the memory device corresponding to a target untranslated address, determining indices of the second LUT associated with the target untranslated address at block 494, mapping the indices of the second LUT to an index of the first LUT at block 495, and retrieving the particular translated address corresponding to the target untranslated address from the first LUT at block 496.

Although not specifically illustrated by FIG. 4, the method 490 can include, in association with the translation request, receiving, by interface component of a memory system including the memory device, the indices of the second LUT from the first portion of the control circuitry. The interface component can map the indices of the second LUT to the index of the first LUT and communicate the index of the first LUT to the second portion of the control circuitry. The method 490 can include performing, by the second portion of the control circuitry, an operation on data stored at the particular translated address.

In some embodiments of the present disclosure, a machine of a computer system (e.g., the computing system 100 described in association with FIG. 1) within which a set of instructions, for causing the machine to perform any one or more of the methodologies discussed herein, can be executed. A machine of a computer system that includes, is coupled to, or utilizes a memory system (e.g., the memory system 110). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In some embodiments, a computer system can include a processing device, a main memory (e.g., read-only memory (ROM), flash memory, dynamic random access memory (DRAM) such as synchronous DRAM (SDRAM) or Rambus DRAM (RDRAM), etc.), a static memory (e.g., flash memory, static random access memory (SRAM), etc.), and a data storage system, which communicate with each other via a bus.

The processing device can be one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device can also be one or more special-purpose processing devices such as an application specific integrated circuit (ASIC), a field programmable gate array (FPGA), a digital signal processor (DSP), network processor, or the like. The processing device can be configured to execute instructions for performing the operations and steps discussed herein. The computer system can further include a network interface device to communicate over the network.

The data storage system can include a machine-readable storage medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    first control circuitry configured to provide a page identifier (PID) and a first identifier having a value indicative of a type of page of memory, of a request for a translated address of a memory device compliant with an NVMe specification, corresponding to a target untranslated address, wherein the PID indicates the page of the memory;
    second control circuitry configured to store a plurality of translated addresses of the memory device in a lookup table (LUT) serving as an address translation cache (ATC); and
    an interface component coupled to the first control circuitry and the second control circuitry and configured to:
    map the PID and the first identifier of the request to a LUT identifier (LUT ID) of the LUT; and provide, to the second control circuitry, the LUT ID to identify, in the LUT, the translated address corresponding to the target untranslated address.

2. The apparatus of claim 1, wherein the second control circuitry is further configured to:
   determine whether the LUT ID is stored in a hash-based search table of the second control circuitry;
   in response to determining that the LUT ID is stored in the hash-based search table, provide the LUT ID to the interface component; and
   in response to determining that the LUT ID is not stored in the hash-based search table, allocate another LUT ID, provide the allocated LUT ID to the interface component, and insert the allocated LUT ID in the hash-based search table.

3. The apparatus of claim 1, wherein the first control circuitry comprises memory system control circuitry of a memory system comprising the memory device, and
   wherein the second control circuitry comprises local control circuitry of the memory device.

4. The apparatus of claim 1, wherein the second control circuitry is further configured to determine the translated address, corresponding to the LUT ID, to translate the target untranslated address.

5. The apparatus of claim 4, wherein the first control circuitry is further configured to perform a read or write operation on data stored at the translated address.

6. The apparatus of claim 1, wherein the first control circuitry operates at a first clock frequency, and
   wherein the second control circuitry operates at a second clock frequency that is different than the first clock frequency.

7. The apparatus of claim 6, wherein the second clock frequency is faster than the first clock frequency.

8. The apparatus of claim 1, wherein the first control circuitry has a first bandwidth, and
   wherein the second control circuitry has a second bandwidth that is different than the first bandwidth.

9. The apparatus of claim 1, wherein the LUT ID is allocated from a free pool of LUT IDs in response to the request for the translated address being made.

10. A non-transitory medium storing instructions executable by a processing device to:
    provide a page identifier (PID) and a first identifier having a value indicative of a type of page of memory, of a request for a translated address of a memory device compliant with an NVMe specification, corresponding to a target untranslated address, wherein the PID indicates the page of the memory;
    receive translation requests including indices, of a first lookup table (LUT), corresponding to respective target untranslated addresses;
    map the indices of the first LUT to indices of a second LUT storing translated addresses of a memory device, wherein the indices of the first LUT are associated with the translated addresses that correspond to the respective target untranslated addresses; and
    map the PID and the first identifier, of the request, to an identifier of the first or second LUT (LUT ID); and
    provide the LUT ID to identify a particular translated address corresponding to the target untranslated address.

11. A method to identify a type of page comprising:
    providing, via first control circuitry, a page identifier (PID) and a first identifier having a value indicative of a type of page of memory, of a request for a translated address of a memory devices corresponding to a target untranslated address, wherein the PID indicates the page of the memory;
    storing, via a second control circuitry, a plurality of translated addresses of the memory device in a lookup table (LUT) serving as an address translation cache (ATC); wherein the first control circuitry and the second control circuitry are coupled to an interface component; and
    mapping the PID and the first identifier of the request to an identifier of the LUT (LUT ID); and
    providing, to the second control circuitry, the LUT ID to identify, in the LUT, the translated address corresponding to the target untranslated address.

* * * * *